United States Patent
Quillen et al.

(10) Patent No.: US 9,344,338 B2
(45) Date of Patent: *May 17, 2016

(54) FACILITATING FILE TRANSFERS USING AN ICON

(75) Inventors: Scott A. Quillen, Middleburg, VA (US); Ira Rosenblatt, Great Falls, VA (US)

(73) Assignee: FACEBOOK, INC., Menlo Park, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 13/620,942

(22) Filed: Sep. 15, 2012

(65) Prior Publication Data

US 2013/0073633 A1    Mar. 21, 2013

Related U.S. Application Data

(63) Continuation of application No. 13/442,231, filed on Apr. 9, 2012, now Pat. No. 8,954,865, which is a continuation of application No. 12/198,633, filed on Aug. 26, 2008, now Pat. No. 8,156,443, which is a (Continued)

(51) Int. Cl.
*G06F 3/0481* (2013.01)
*H04L 12/24* (2006.01)

(Continued)

(52) U.S. Cl.
CPC ............. *H04L 41/22* (2013.01); *G06F 3/0486* (2013.01); *G06F 3/04812* (2013.01); *G06F 3/04817* (2013.01); *H04L 12/1813* (2013.01); *H04L 12/581* (2013.01); *H04L 67/22* (2013.01); *H04L 67/36* (2013.01); *H04L 69/329* (2013.01)

(58) Field of Classification Search
CPC . G06F 3/0481; G06F 3/04817; G06F 3/0486; H04L 12/581
USPC .......... 715/847, 742, 846, 752, 758; 370/352, 370/395.54; 455/902; 709/206, 224; 713/150, 155, 168
See application file for complete search history.

(56) References Cited

U.S. PATENT DOCUMENTS 5,751,933 A    5/1998    Dev et al.
5,801,700 A    9/1998    Ferguson (Continued)

FOREIGN PATENT DOCUMENTS

JP    2008-227558    9/2008

OTHER PUBLICATIONS www.cs.hmc.edu/~ben/gnome/summit/, Links From the 2002 Boston Gnome Summit, Oct. 28, 2002, 1 page.

(Continued)

*Primary Examiner* — Steven Sax
(74) *Attorney, Agent, or Firm* — Keller Jolley Preece

(57) ABSTRACT

A stand-alone icon (i.e., an icon that is not part of an application interface) is provided to facilitate communications across a network between users of at least one communications program. The icon represents a contact or a set of contacts. Status information regarding the contact or set of contacts is received and displayed using the icon or in response to an operation performed on the icon. The icon additionally may provide an interface for performing actions related to the contact or set of contacts. The actions may generally include, for example, retrieving profile information about the contact, setting an alert to indicate that the contact's network/login status (e.g., login, logout, or idle) has changed, or performing communications with the contact.

33 Claims, 21 Drawing Sheets

Related U.S. Application Data continuation of application No. 10/392,300, filed on Mar. 20, 2003, now Pat. No. 7,434,169, which is a continuation-in-part of application No. 10/330,670, filed on Dec. 30, 2002, now Pat. No. 7,266,776.

(60) Provisional application No. 60/428,726, filed on Nov. 25, 2002.

(51) Int. Cl.
  *H04L 12/18* (2006.01)
  *H04L 12/58* (2006.01)
  *H04L 29/08* (2006.01)
  *G06F 3/0486* (2013.01)

(56) References Cited

U.S. PATENT DOCUMENTS

| | | | |
|---|---|---|---|
| 5,978,797 A | 11/1999 | Yianilos | |
| 6,067,568 A | 5/2000 | Li et al. | |
| 6,191,807 B1 | 2/2001 | Hamada et al. | |
| 6,400,381 B1 | 6/2002 | Barrett et al. | |
| 6,442,754 B1* | 8/2002 | Curtis | G06F 8/61 707/999.104 |
| 6,496,201 B1 | 12/2002 | Baldwin et al. | |
| 6,559,862 B1 | 5/2003 | Nakazawa | |
| 6,757,710 B2 | 6/2004 | Reed | |
| 6,763,226 B1 | 7/2004 | McZeal, Jr. | |
| 6,771,290 B1 | 8/2004 | Hoyle | |
| 6,791,583 B2 | 9/2004 | Tang et al. | |
| 6,865,268 B1 | 3/2005 | Matthews et al. | |
| 6,883,094 B2 | 4/2005 | Kitamura | |
| 7,120,677 B1 | 10/2006 | Berger et al. | |
| 7,219,302 B1 | 5/2007 | O'Shaughnessy et al. | |
| 7,225,409 B1 | 5/2007 | Schnarel et al. | |
| 7,266,776 B2 | 9/2007 | Quillen et al. | |
| 7,336,668 B2 | 2/2008 | Adams | |
| 7,353,267 B1 | 4/2008 | Cunningham et al. | |
| 7,434,169 B2 | 10/2008 | Quillen et al. | |
| 7,533,400 B1 | 5/2009 | Hailey et al. | |
| 7,698,649 B2 | 4/2010 | Quillen et al. | |
| 7,747,527 B1* | 6/2010 | Korala | G06Q 20/108 705/35 |
| 8,156,443 B2* | 4/2012 | Quillen et al. | 715/758 |
| 2001/0050918 A1 | 12/2001 | Surprenant et al. | |
| 2002/0054750 A1 | 5/2002 | Ficco et al. | |
| 2002/0062361 A1 | 5/2002 | Kivipuro et al. | |
| 2002/0140741 A1 | 10/2002 | Felkey et al. | |
| 2002/0164006 A1 | 11/2002 | Weiss | |
| 2002/0181472 A1 | 12/2002 | Horikawa | |
| 2003/0013483 A1 | 1/2003 | Ausems et al. | |
| 2003/0046296 A1* | 3/2003 | Doss et al. | 707/102 |
| 2003/0079024 A1 | 4/2003 | Hough et al. | |
| 2003/0093482 A1 | 5/2003 | Watanabe et al. | |
| 2003/0125062 A1 | 7/2003 | Bethards et al. | |
| 2003/0140103 A1 | 7/2003 | Szeto et al. | |
| 2003/0154293 A1 | 8/2003 | Zmolek | |
| 2003/0208543 A1 | 11/2003 | Enete et al. | |
| 2003/0208545 A1 | 11/2003 | Eaton et al. | |
| 2003/0210265 A1 | 11/2003 | Haimberg | |
| 2003/0219104 A1 | 11/2003 | Malik | |
| 2003/0221167 A1 | 11/2003 | Goldstein et al. | |
| 2004/0027375 A1* | 2/2004 | Ellis | G06F 9/4445 715/753 |
| 2004/0054428 A1 | 3/2004 | Sheha et al. | |
| 2004/0056893 A1 | 3/2004 | Canfield et al. | |
| 2004/0056901 A1 | 3/2004 | March et al. | |
| 2004/0093417 A1 | 5/2004 | Perry | |
| 2004/0103156 A1 | 5/2004 | Quillen et al. | |
| 2004/0192397 A1 | 9/2004 | Walston et al. | |
| 2004/0201624 A1 | 10/2004 | Crawford | |
| 2005/0030937 A1 | 2/2005 | Wick et al. | |
| 2006/0069635 A1* | 3/2006 | Ram | G06Q 30/08 705/37 |
| 2006/0106734 A1 | 5/2006 | Hoffman et al. | |
| 2007/0006094 A1 | 1/2007 | Canfield et al. | |
| 2007/0022155 A1 | 1/2007 | Owens et al. | |
| 2012/0198013 A1 | 8/2012 | Quillen et al. | |
| 2013/0073973 A1 | 3/2013 | Quillen et al. | |
| 2015/0113419 A1 | 4/2015 | Quillen et al. | |

OTHER PUBLICATIONS www.cs.hmc.edu/~ben/gnome/summit/gaim-talk.html, Notes on Gaim: Instant Messaging for the Desktop User, Oct. 28, 2002, 2 pages.
www.slaughterhouse.com/pick_071497.html, Pick of the Day—Jul. 14, 1997, Oct. 28, 2002, 2 pages.
Notification of Transmittal of the International Search Report for PCT/US03/36655, issued on May 19th, 2008.
U.S. Appl. No. 10/330,670, Jun. 28, 2006, Office Action.
U.S. Appl. No. 10/330,670, Dec. 18, 2006, Office Action.
U.S. Appl. No. 10/330,670, Mar. 13, 2007, Notice of Allowance.
U.S. Appl. No. 10/330,670, Mar. 30, 2007, Notice of Allowance.
U.S. Appl. No. 10/392,300, Jun. 28, 2006, Office Action.
U.S. Appl. No. 10/392,300, Dec. 18, 2006, Office Action.
U.S. Appl. No. 10/392,300, May 24, 2007, Office Action.
U.S. Appl. No. 10/392,300, Nov. 16, 2007, Office Action.
U.S. Appl. No. 10/392,300, May 21, 2008, Notice of Allowance.
U.S. Appl. No. 10/392,300, Jul. 17, 2008, Notice of Allowance.
U.S. Appl. No. 11/777,706, Apr. 3, 2009, Office Action.
U.S. Appl. No. 11/777,706, Oct. 30, 2009, Office Action.
U.S. Appl. No. 11/777,706, Nov. 17, 2009, Office Action.
U.S. Appl. No. 11/777,706, Nov. 25, 2009, Notice of Allowance.
U.S. Appl. No. 12/198,633, May 24, 2010, Office Action.
U.S. Appl. No. 12/198,633, Nov. 10, 2010, Office Action.
U.S. Appl. No. 12/198,633, Jun. 13, 2011, Office Action.
U.S. Appl. No. 12/198,633, Dec. 8, 2011, Notice of Allowance.
U.S. Appl. No. 14/592,735, Jan. 8, 2015, Quillen et al.
U.S. Appl. No. 13/442,231, Aug. 27, 2014, Office Action.
U.S. Appl. No. 13/442,231, Nov. 21, 2014, Notice of Allowance.
U.S. Appl. No. 13/620,938, Jun. 5, 2015, Notice of Allowance.

* cited by examiner

300

```
Provide a stand-alone icon that
represents a contact or set of contacts
              305
```
↓
```
Receive status information regarding
    the contact or set of contacts
              310
```
↓
```
Display the status information using
the icon or in response to an operation
        performed on the icon
                315
```

```
┌─────────────────────────────┐
│ Recognize an operation that is │
│   performed on the icon     │
│            325              │
└─────────────────────────────┘
              │
              ▼
┌─────────────────────────────┐
│ Execute at least one action in │
│ response to an operation performed │
│        on the icon          │
│            330              │
└─────────────────────────────┘
```

```
┌─────────────────────────────────────────────┐
│ Recognize that a second icon has been dropped│
│              onto the first icon             │
│                     405                      │
└─────────────────────────────────────────────┘
                      │
                      ▼
┌─────────────────────────────────────────────┐
│      Automatically transmit the information  │
│  represented by the second icon to the contact or│
│   set of contacts represented by the first icon│
│                     410                      │
└─────────────────────────────────────────────┘
```

Figure 4

FACILITATING FILE TRANSFERS USING AN ICON

This application is a continuation of U.S. application Ser. No. 13/442,231, filed on Apr. 9, 2012, which issued as U.S. Pat. No. 8,954,865, which is a continuation of U.S. application Ser. No. 12/198,633, filed on Aug. 26, 2008, which issued as U.S. Pat. No. 8,156,443, which is a continuation of U.S. application Ser. No. 10/392,300, filed Mar. 20, 2003, which issued as U.S. Pat. No. 7,434,169, which is a continuation-in-part of U.S. application Ser. No. 10/330,670, filed on Dec. 30, 2002, which issued as U.S. Pat. No. 7,266,776, which claims priority to U.S. Provisional Application Ser. No. 60/428,726, filed on Nov. 25, 2002, all of which are hereby incorporated by reference herein.

TECHNICAL FIELD

This description relates to electronic communications.

BACKGROUND

With the advent of the Internet and a decline in computer prices, many people are communicating with one another through computers interconnected by networks. A number of different communications programs have been developed to facilitate such communications between computer users. These programs typically have a user interface that presents representations of a user's contacts (i.e., other users who are connected to the network and with whom the user of the program can communicate). A user may invoke communications or other interactions with a particular contact by selecting a representation of that contact that is maintained as a part of the communications program's user interface. The representations typically also provide status information regarding the contact, such as whether the contact is online, how long the contact has been online, whether the contact is away, or whether the contact is using a mobile device.

SUMMARY

In one general aspect, a stand-alone icon is provided to facilitate network communications between users of at least one communications program. The icon represents at least one contact of a user. When status information regarding the contact is received, the status information is displayed using the icon or in response to an operation performed on the icon.

The status information may include, for example, whether the contact is online, how long the contact has been online, whether the contact is away or busy, whether the contact is using a mobile device, what types of connections the contact can accept, what capabilities are provided by the contact's connection, or what capabilities are provided by the communications program Implementations may include one or more of the following features. For example, the stand-alone icon also may provide an interface for performing actions related to the contact. When an operation that is associated with at least one action related to the contact is performed on the icon, the action is executed in response to the operation being performed on the icon. The action may be the same as an action that would be executed in response to an operation performed on a representation of the contact in a user interface of the communications program.

The operation associated with the action may include dropping an icon representing information to be transmitted to the contact on the stand-alone icon, with the associated action including the transmission of the information to the contact. The information may be, for example, in a text or file form.

The icon that represents a contact or set of contacts may be available when the communications program is not executing. The communications program may be initiated in response to an operation being performed on the icon representing the contact.

The communications program may be, for example, an electronic mail (e-mail) program, an instant messaging (IM) program, a file transfer protocol (FTP) program, or a voice-over-IP (VoIP) program.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 3A is a flow chart illustrating a process used to facilitate communications between users across a network in which status information of a contact is displayed using a stand-alone icon representing a contact or set of contacts or in response to an operation performed on the icon.

FIG. 3B illustrates a process for additionally using the stand-alone icon to provide an interface for performing actions related to the contact or set of contacts.

FIG. 4 illustrates a process for using drag-and-drop features with the stand-alone icon to provide an interface for actions such as transferring files or text.

Like reference symbols in the various drawings indicate like elements.

DETAILED DESCRIPTION

A stand-alone icon (i.e., an icon that is not part of an application interface) is provided to facilitate communications across a network between users of at least one communications program. The icon represents a contact or a set of contacts. Status information regarding the contact or set of contacts is received and displayed using the icon or in response to an operation performed on the icon. The icon additionally may provide an interface for performing actions related to the contact or set of contacts. The actions may generally include, for example, retrieving profile information about the contact, setting an alert to indicate that the contact's network/login status (e.g., login, logout, or idle) has changed, or performing communications with the contact.

Figure 1:
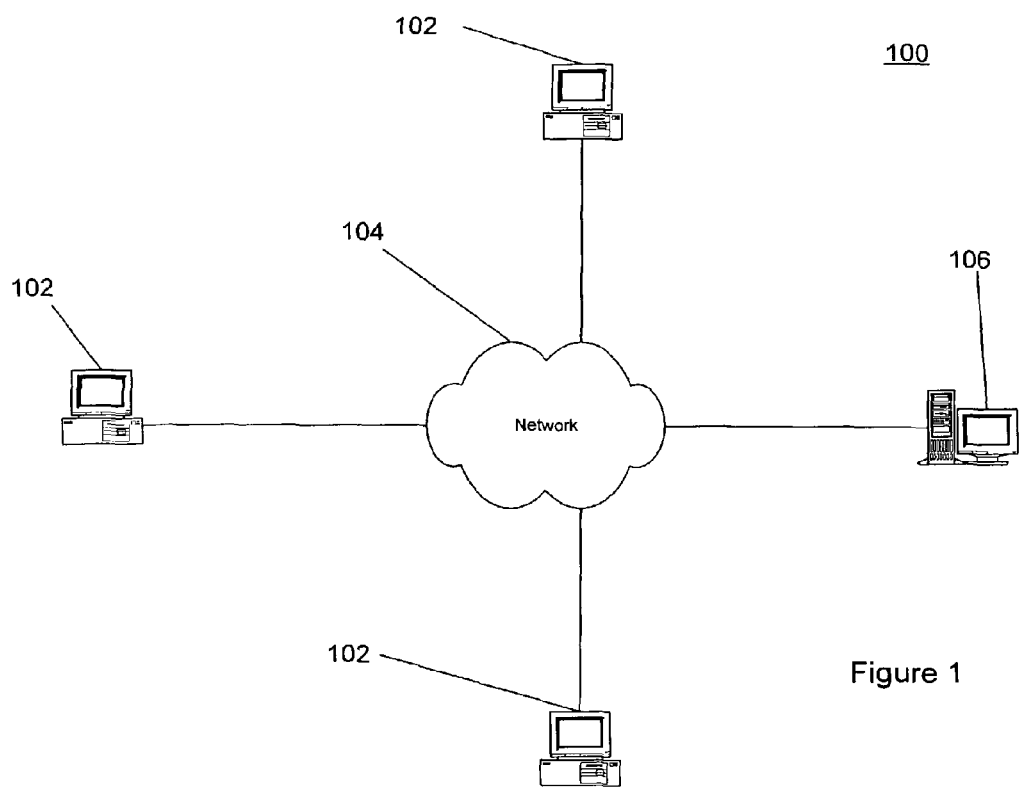
FIG. 1 is a block diagram illustrating an exemplary networked computing environment that supports communications between computer users.

FIG. 1 illustrates an exemplary networked computing environment 100 that supports communications between computer users. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)). A host server 106 also may be connected to network 104 and may be used to facilitate some direct or indirect communications between the client systems 102.

Each of the client systems 102 and host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 and host server 106 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 102. Such communications programs may include, for example, e-mail programs, IM programs, FTP programs, or VoIP programs. The instructions may be embodied permanently or temporarily in any type of machine, component, equipment, storage medium, or propagated signal that is capable of being delivered to a client system 102 or the host server 106.

Each client system 102 and host server 106 includes a communications interface (not shown) used by the communications programs to send communications through network 104. The communications may include e-mail, audio data, video data, general binary data, or text data (e.g., data encoded in American Standard Code for Information Interchange (ASCII) format).

The network 104 typically includes a series of portals interconnected through a coherent system. Examples of the network 104 include the Internet, Wide Area Networks (WANs), Local Area Networks (LANs), analog or digital wired and wireless telephone networks (e.g., a Public Switched Telephone Network (PSTN)), an Integrated Services Digital Network (ISDN), or a Digital Subscriber Line (xDSL)), or any other wired or wireless network. The network 104 may include multiple networks or subnetworks, each of which may include, for example, a wired or wireless data pathway.

Figure 2:
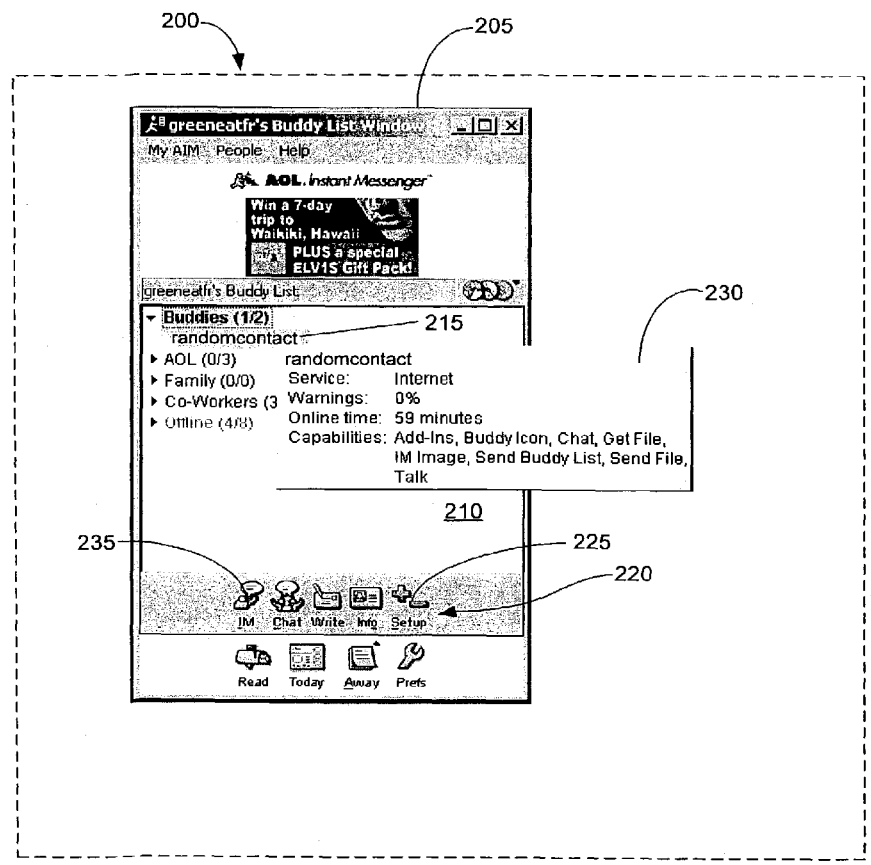
FIG. 2 is a computer desktop illustrating an example of a communications program interface presented to a user of the communications program.

FIG. 2 illustrates an exemplary interface presented to a user of one of the client systems 102 when running an instant messaging client program. Instant messaging programs typically allow users to communicate in real-time with each other in a variety of ways. For example, many instant messaging programs allow users to send text as an instant message, to transfer files, and to communicate by voice. Examples of IM programs include those provided by AIM (America Online Instant Messenger), AOL (America Online) Instant Messaging, Yahoo Messenger, MSN Messenger, and ICQ.

Shown is a desktop 200 with a user interface 205 of the instant messaging client program. User interface 205 has a text box 210 that displays representations 215 of the program user's contacts or buddies (both terms are used interchangeably herein), which are other users of an instant messaging program with whom the program user desires to communicate and interact. The representations 215 may provide status information to the program user about the contact, such as whether the contact is online, how long the contact has been online, whether the contact is away, or whether the contact is using a mobile device. The status information may be provided in a number of different ways.

For instance, in the exemplary interface 205, buddies who are not connected to the network are listed under the "Offline" category, while ones who are online (e.g., randomcontact) are listed in a corresponding category (e.g., "Buddies"). In the exemplary interface 205, a dialog box 230 that is displayed, for example, when a user points at a contact's representation with a cursor, provides other status information regarding the contact. Icons (not shown) may be displayed next to the contact's name to indicate other status information, such as when the contact is away (i.e., not at his or her computer or other communication device). Dialog box 230 displays the network through which the contact is communicating (i.e., "Service") and how long the contact has been connected to the network (i.e., "Online time"). Dialog box 230 also displays which communication types and other features the contact's IM program supports (i.e., "Capabilities"). In addition, a warning level (i.e., "Warnings") is displayed for the contact to provide an indication of how well the contact behaves online. A dialog box such as box 230 may display other status information, such as whether the user is connected to the network through a mobile device or whether the user is away.

The list of contacts displayed in text box 210 of user interface 205 typically is referred to as the contact list or buddy list. The program user can typically add or remove contacts from the contact list. In the example shown, the representations 215 are text icons showing the screen names of the contacts.

Instant messaging programs may use an instant messaging server to assist in communications between users of the instant messaging program. The instant messaging server may be implemented, for example, using host server 106. When a user is connected to the network and executes the instant messaging program, the instant messaging program contacts the host server 106 and logs the user onto the host server 106. The host server 106 informs the instant messaging program about status information regarding the user's contacts and facilitates communications between the program user and an online contact.

The host server 106 may support IM services irrespective of a program user's network or Internet access. Thus, host server 106 may allow users to send and receive IMs, regardless of whether they have access to any particular Internet service provider (ISP). The host server 106 also may support associated services, such as administrative matters, advertising, directory services, chat, and interest groups related to IM. To transfer data, the host server 106 employs one or more standard or proprietary IM protocols.

To begin an IM session, the IM client program running on a client system 102 establishes a connection with the host server 106 and logs onto the host server 106. Once a session is established, a user can use the IM client program to view status information exchange IMs with particular buddies, participate in group chat rooms, trade files such as pictures, invitations or documents. The program user also may be able to find other buddies with similar interests, get customized information such as news and stock quotes, and search the World Wide Web.

Host server 106 may assist IM communications between users of IM client programs by facilitating the establishment of a peer-to-peer communication session between the IM client programs. Or the host server 106 may assist IM communications by directly routing communications between the IM client programs.

When a contact is online, the program user can communicate or interact with the contact in a number of ways. For instance, the program user can send an instant message to the contact (typically in the form of text). Sending a message opens up a window in which messages can be typed back-and-forth between the program user and the contact. Similarly, the program user also can send a file or other content to the contact.

To initiate these actions for a contact, the program user performs operations on the representation of the contact displayed in user interface 205. The program then executes the corresponding action in response to the operation performed on the representation. For example, an instant message might be initiated by double-clicking on a contact's representation. Or, a file transfer might be initiated by the program user selecting the contact's representation to bring up a context menu and choosing "send a file" from the menu.

Other actions can be executed in response to operations performed on the representation of the contact displayed in interface 205. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 205 may have icons 220 to help a user set various options or perform operations in the instant messaging program. By selecting the "setup" icon 225, for example, the program user can invoke a window that allows for manual addition or removal of contacts from the buddy list. Some of the icons 220 also may assist in initiating communications or interactions. The "IM" icon 235, for instance, may be used as an alternative way to initiate instant messages. For instance, the program user can highlight the representation of a contact, and initiate an instant message with that contact by selecting the "IM" icon.

FIG. 3A illustrates a process 300 used to facilitate communications across a network between users of at least one communications program. A stand-alone icon (i.e., one that is not part of an application user interface) that represents a contact or set of contacts is provided at a client system (step 305). The term "icon" is used generally herein to denote any graphical representation of an object. Status information regarding the contact or set of contacts is received at the client system (310). The status information is displayed using the icon or in response to an operation performed on the icon (315).

The status information may be any information that describes the state of affairs of the contact, the contact's network connection, or a communications program used by the contact. For example, the status information may be whether the contact is online, how long the contact has been online, whether the contact is away or busy, whether the contact is using a mobile device, what types of connections the contact can accept (e.g., peer-to-peer or host-based), or what capabilities are provided by the connection or the communications program used by the contact.

The icon can be used to indicate status information in a number of different ways. For example, the color, shape, size, orientation, or features of the icon may be changed to indicate status information. In addition, or alternatively, the status information may be displayed (e.g., in a pop-up contextual menu or in a "tooltip," which is a pop-up box that displays information) in response to a particular operation performed on the icon.

The operation that results in the display of the status information may be any of various operations capable of being performed on the icon. For example, a user may point a cursor at the icon using an input device like a mouse. A user may "double-click" on the icon by using a mouse to point a cursor at the icon and pressing a button of the mouse twice. A user may "right-click" on the icon by using a mouse with a left and right button to point a cursor at the icon and pressing the right button of the mouse. A user may select the icon in such a way that brings up a context menu (e.g., by right-clicking on the icon) and select an option from the context menu. A user may drag-and-drop other icons onto the icon representing the contact or set of contacts (further described below). The icon representing the contact may be dragged and dropped onto another icon or onto the user interface of an application. Other operations may be available depending on the implementation and/or operating system environment.

Process 300 may be implemented through any suitable type of hardware, software, device, computer, computer system, equipment, component, program, application, code, storage medium, or propagated signal. The various parts of the process 300 may be performed by the same item, or multiple items may cooperate to accomplish the results. For instance, the communications program (e.g., an IM program) may receive the status information and cause the information to be displayed using the icon or in response to an operation performed on the icon. Alternatively, the communications program may receive the status information, communicate the status information to separate executable file, which then causes the information to be displayed using the icon or in response to an operation performed on the icon. The icon may or may not represent the executable file (e.g., in some graphical operating system environments, such as Macintosh OS X and Microsoft Windows®, files are represented by icons). In other implementations, other software or hardware, such as plug-ins for the IM program, other stand-alone applications, or the computer operating system, also may contribute or cooperate to perform the various aspects of process 300.

FIG. 3B illustrates a process 320 for additionally using the icon to provide an interface for performing actions related to the contact or set of contacts. In addition to providing status information, in some implementations the icon may provide an interface for performing actions related to the contact or set of contacts, such as sending IMs or files.

When an operation associated with at least one action related to the contact or set of contacts is performed on the icon, the operation is recognized (325) and the associated action is executed (330). The operation associated with the action may be any of various operations capable of being performed on the icon. For example, the operation generally may be any of those described above, such as pointing at the icon, "double-clicking" on the icon, "right-clicking" on the icon, dragging and dropping files onto the icon, or dragging and dropping the icon onto another icon or onto the user interface of an application. Other operations may be available depending on the implementation and/or operating system environment.

The action may include, for instance, sending an IM, sending a file, setting a buddy icon, retrieving profile information about the contact, setting an alert for when the contact comes online, establishing a VoIP communication session, or sending an e-mail. These actions may be the same actions that would be executed in response to an operation performed on a representation of the contact or set of contacts in a user interface of the communications program.

FIG. 4 illustrates a process 400 for using drag-and-drop features with the icon to provide an interface for actions such as transferring files or text. In this case, the icon also provides an interface for initiating the transfer of information to the contact(s) represented by the icon from outside of any application's user interface (e.g., on the desktop or in a file folder).

When a user wants to transfer information to the contact or set of contacts represented by this icon, the user drags and drops a second icon that represents the information onto the icon representing the contact or set of contacts. The information may be any type of data, including e-mail, audio data, video data, general binary data, or text data.

The drop is recognized (step 410) and results in the information represented by the second icon being automatically transferred to the contact or set of contacts (step 415). The information can be transmitted to the contact in any known manner. For instance, a peer-to-peer connection can be established and, if the information is in the form of a general binary file, the file may be transmitted using a standard or proprietary file transfer protocol. Or, if the information is, for example, streaming audio or video, the information may be transmitted on the peer-to-peer connection using the real-time protocol (RTP) and real-time streaming protocol (RTSP). Similarly, if the information is a text file, the peer-to-peer connection may be used to transfer the text in the text file as an IM.

Alternatively, a host server may be used to assist in the transmission of the information. For instance, if the information is a text file, the host server may relay the text file to the contact as an IM. Or, if the information is in the form of a general binary file, the file may be transmitted to the host server, which relays it to the contact using a standard or proprietary file transfer protocol. Likewise, streaming audio or video can be transmitted to the host server, which then relays the streaming audio or video to the contact.

As with the process 300, processes 320 and 400 may be implemented through any suitable type of hardware, software, device, computer, computer system, equipment, component, program, application, code, storage medium, or propagated signal.

FIGS. 5A-5I illustrate implementations of the above techniques with an instant messaging program. Shown is a desktop 500 with a user interface 205 of the instant messaging program. User interface 205 has a text box 210 that displays representations 215 of the program user's contacts. In the example illustrated, one contact, whose screen name is "randomcontact," is listed. Also shown is a stand-alone icon 520 that represents the contact "randomcontact."

FIGS. 5A-5D illustrate various manners in which status information may be displayed using an icon representing a contact or in response to an operation performed on the icon. In the implementations illustrated, the icon 520 is associated with an executable program or script that communicates with the IM program to accomplish the display of the status information. However, as described above, other software or hardware can perform all or some of the techniques in other implementations. The executable program may communicate with the instant messaging program using any known inter-application communications protocol, such as, for example, Apple Events if implemented for a Macintosh OS X environment or dynamic data exchange (DDE) if implemented for a Microsoft Windows® environment. While shown on desktop 500, icon 520 can be moved like any other file and located in a file system folder, if desired.

In these implementations, the IM program receives status information regarding the contact "randomcontact." The IM program then communicates with the executable program to transfer the status information to the executable program. The executable program then uses the icon to display the status information, or displays the information in response to an operation performed on the icon.

Figure 5A:
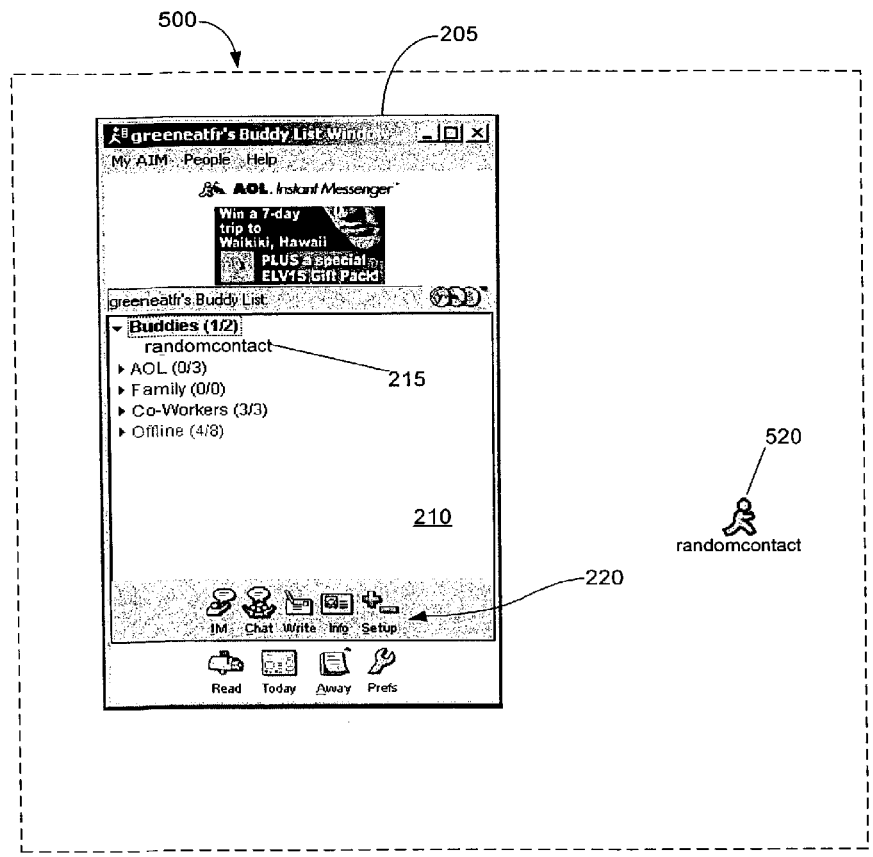
FIGS. 5A-5I are computer desktops illustrating implementations of the described techniques with an instant messaging program.

FIG. 5A shows the icon 520 when the contact "randomcontact" is not online.

Figure 5B:
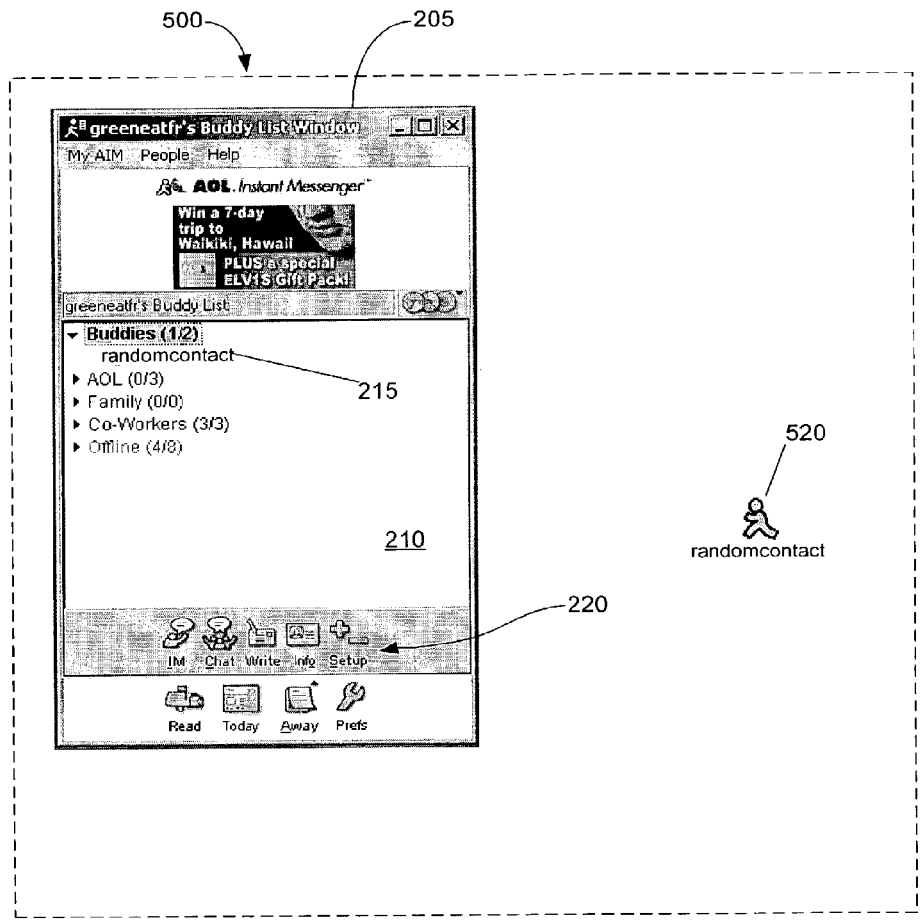

FIG. 5B shows an implementation in which the orientation of the icon 520 is changed when the contact is online. As shown in FIG. 5B, "randomcontact" is online and icon 520 is flipped horizontally in response to indicate that the contact is online.

Figure 5C:
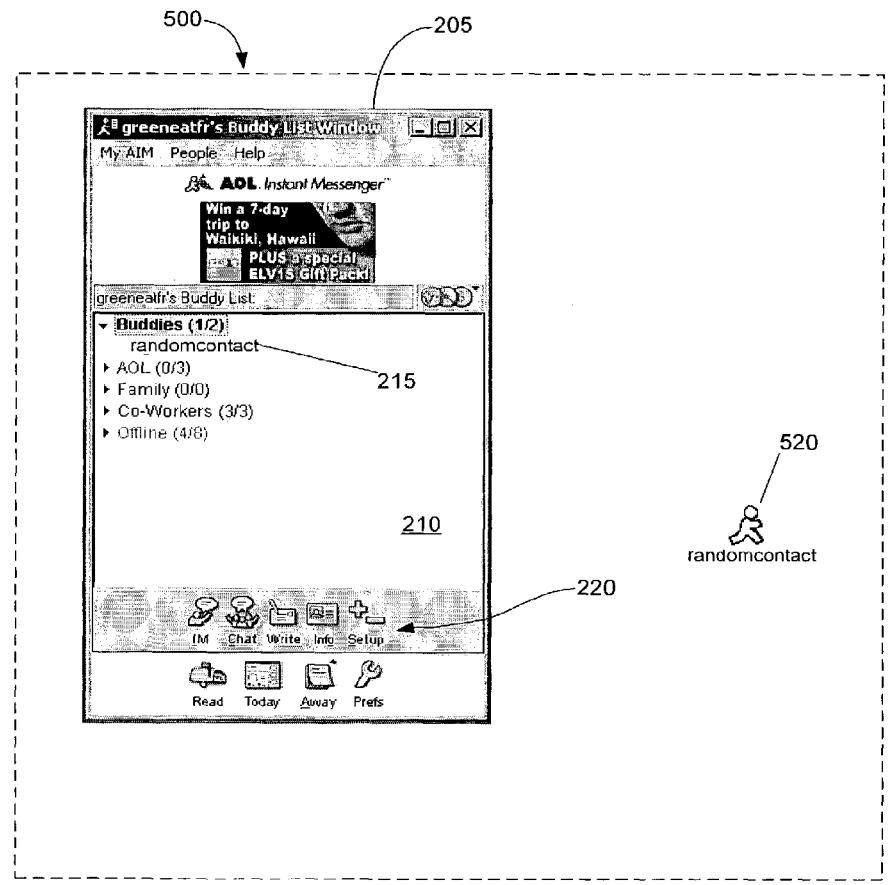

FIG. 5C shows an example in which the color of the icon 520 is changed when the user is online. As shown in FIG. 5C, "randomcontact" is online and the color of icon 520 is changed to white to indicate that the contact is online.

Figure 5D:
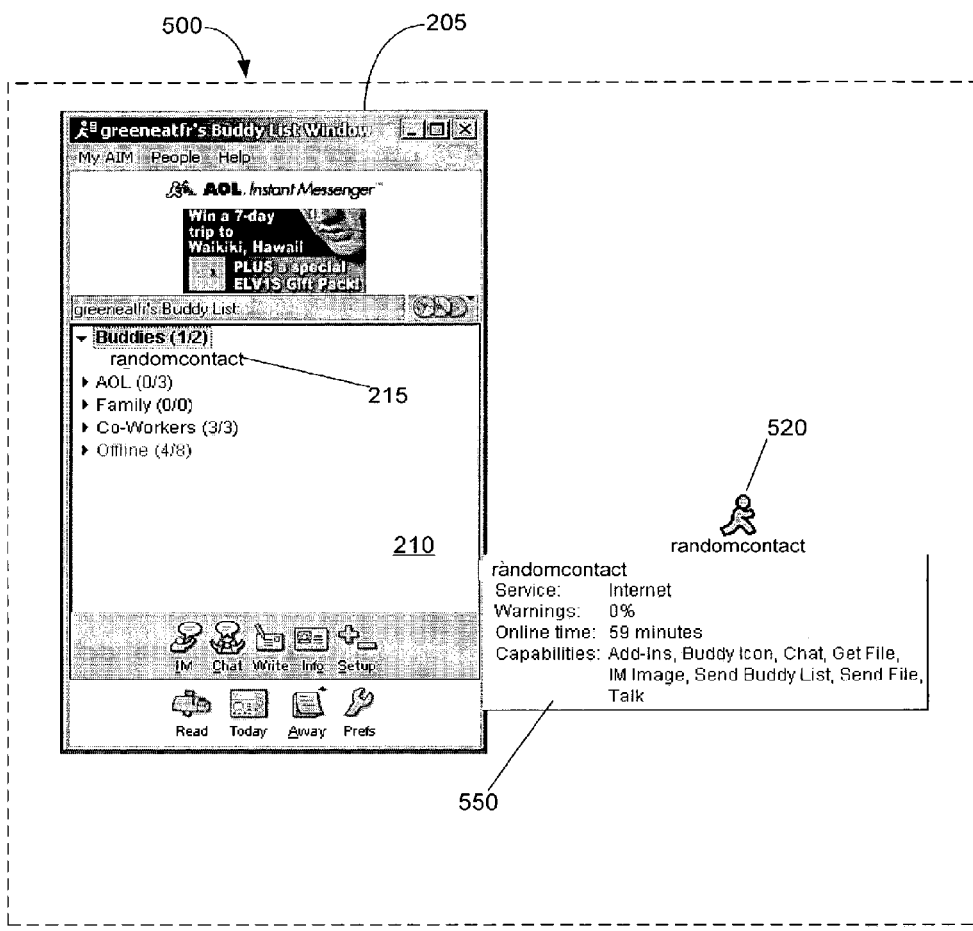

FIG. 5D shows an implementation in which a dialog box 550 displays status information. In the exemplary dialog box 550 shown, the contact's service, warning level, time online, and the capabilities of a communications program (e.g., an IM program) are displayed. Dialog box 550 may be a part of icon 520 or it can be a separate pop-up dialog that is displayed in response to an operation performed on icon 520 (e.g., when a user points a cursor at icon 520).

FIGS. 5E-5I illustrate implementations in which the icon additionally provides an interface to perform actions related to the contact. In this case, a user can initiate actions related to the contact "randomcontact" by performing operations on icon 520. As described above, various types of operations can be performed on icon 520, such as "double-clicking" on icon 520, "right-clicking" on icon 520, dragging and dropping other icons onto icon 520, or dragging and dropping icon 520 onto another icon or onto the user interface of an application.

In the illustrated implementations, icon 520 is associated with an executable program or script that is invoked for some operations performed on icon 520. The executable program communicates with the instant messaging program to accomplish the actions to be executed in response to the operations performed on icon 520. The executable program is invoked when operations are performed on icon 520 that correspond to actions related to the contact represented by icon 520. When invoked, the executable program in turn may invoke the instant messaging program if the instant messaging program is not already executing. The invocation of the instant messaging program may or may not be made known to the user. For example, invocation of the instant messaging program may be made known to the user by presenting the instant messaging program's interface to the user in the same manner as the interface would be presented if the user had directly invoked the program. Or, an icon can be displayed in the system tray (if, for example, the techniques are implemented for a Microsoft Windows® environment).

As an alternative to invoking the instant messaging program, the executable program may queue the actions until the instant messaging program is invoked by the user. In this case, when the instant messaging program is subsequently invoked, the executable program will communicate with the instant messaging client program to accomplish the actions.

When the instant messaging program is running, the executable program passes the screen name of the contact represented by icon 520 (i.e., "randomcontact") to the instant messaging program along with an indication of the action to be executed and any other necessary information needed to perform the action (e.g., filename). The instant messaging program accepts this information and executes the action corresponding to the operations performed on icon 520.

Figure 5E:
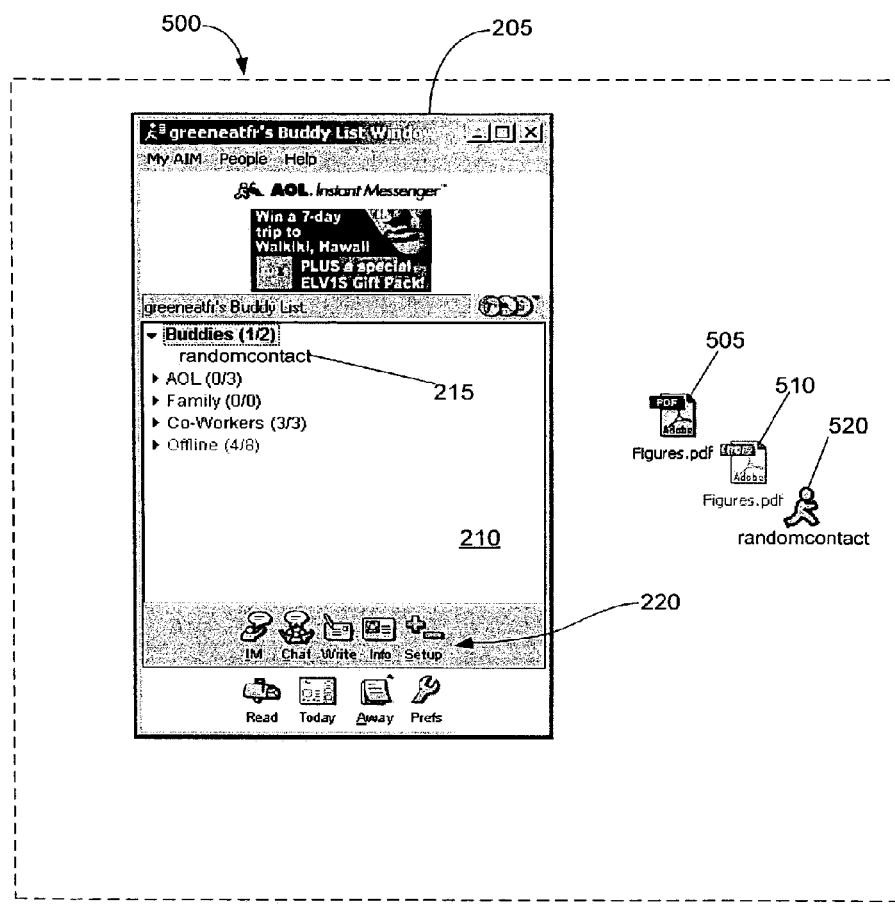
Figure 5F:
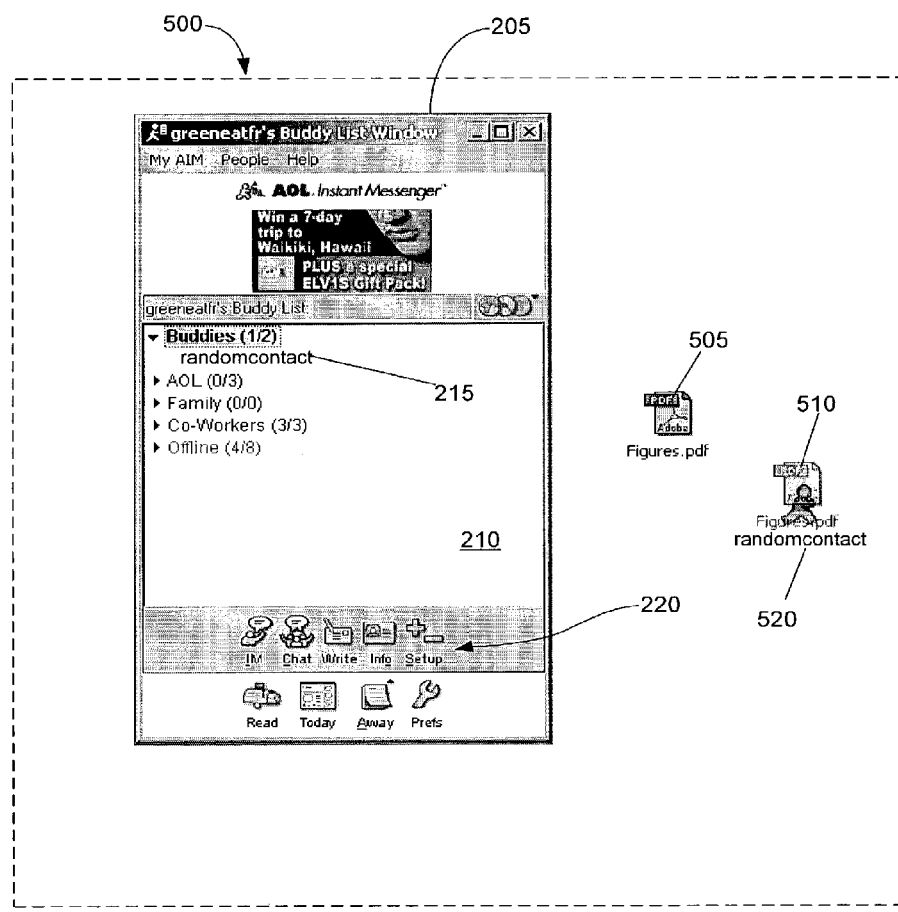
Figure 5G:
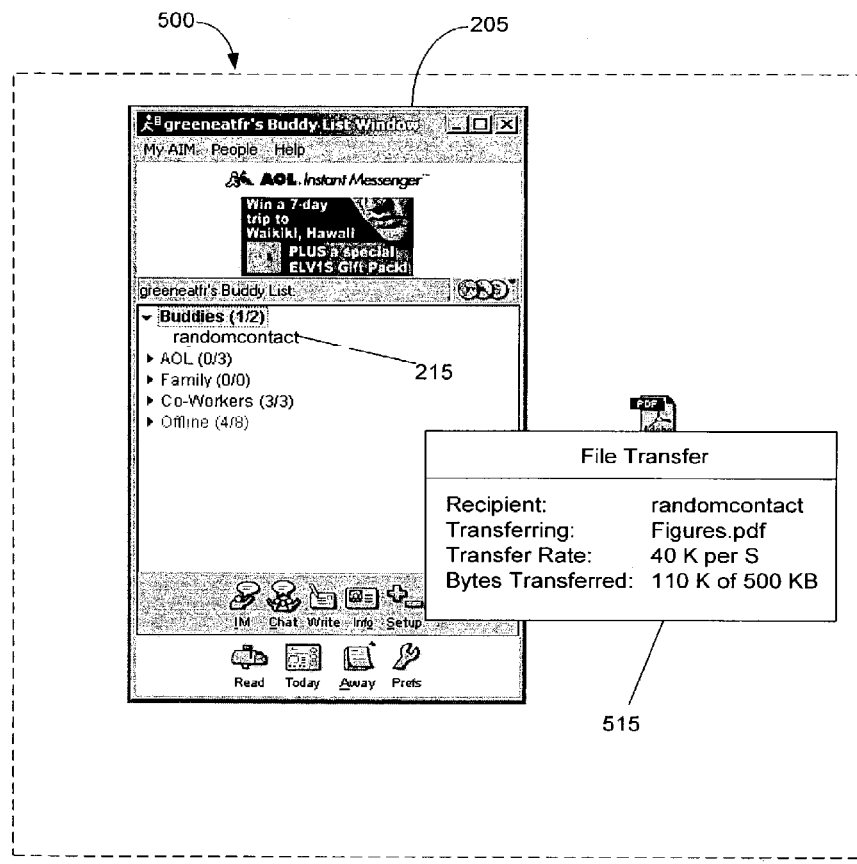

As an example of operations and associated actions that can be supported, a drag-and-drop file transfer is described with respect to FIGS. 5E-5G. An icon 505 on desktop 500 represents a general binary file. To transfer the file to the contact "randomcontact," the user drags and drops icon 505 onto icon 520. To drag icon 505 onto icon 520, the user first selects icon 505, for example, by pointing at icon 505 and pressing a mouse button. The user then drags the icon 505 towards icon 520. As the user drags the icon across desktop 500, a second transparent image 510 of icon 520 shows the user where icon 505 is being dragged. Once icon 505 is on top of icon 520 (as shown in FIG. 5F), the user drops icon 505, for example, by releasing the mouse button.

When the user drops icon 505 onto icon 520, the executable program associated with icon 520 is invoked. The executable program determines whether the instant messaging program is executing and logged onto the host server. If the instant messaging program is not executing or is not logged on, the executable program invokes the instant messaging program and causes the instant messaging program to log onto the host server.

When the instant messaging program is executing and is logged on (regardless of whether it was originally executing or was invoked by the executable program), the executable program passes to the instant messaging program the screen name that icon 520 represents (in the case shown, "randomcontact"), the filename, and an indication that the file should be transferred.

The instant messaging program then initiates a file transfer to the contact. To do so, the instant messaging program contacts the host server and indicates that a file transfer to the contact is desired. The host server indicates to the contact that the program user wishes to transfer the file and seeks permission from the contact for the file to be transferred. As long as the contact grants permission for the file to be transferred, the host server returns the address of the contact to the instant messaging program, along with an indication that the transfer is allowed.

The instant messaging program then sets up a peer-to-peer connection with the contact's instant messaging program and transfers the file. As the file is being transferred, the instant messaging program may display a file transfer status dialog 515 (shown in FIG. 5G). File transfer status dialog 515 shows the current status of the file transfer. As shown, the dialog 515 displays the recipient, which in this case is "randomcontact." The dialog 515 also displays the filename of the file being transferred (Figures.pdf), the transfer rate (40K/s), and the number of bytes already transferred (110K). Once the transfer is completed, feedback (e.g., a sound) may be provided to the user to indicate the transfer is completed, and the file status dialog 515 is closed.

Similar to a file transfer, drag-and-drop instant message sessions can be supported when a user drops a text file onto icon 520. Thus, for example, if the file shown in FIG. 5E was named Figures.txt and contained ASCII text, then an instant message would be initiated when the file is dropped on icon 520, rather than a file transfer. In this case, when the text file is dropped, the executable program retrieves the text from the file. The executable program then passes the screen name represented by icon 520 and the text to the instant messaging program, along with an indication that the text is to be sent as an instant message. The instant messaging program then contacts a host server and transmits the text and screen name to the host server. The host server then directly communicates the text to the contact as an instant message.

Figure 5H:
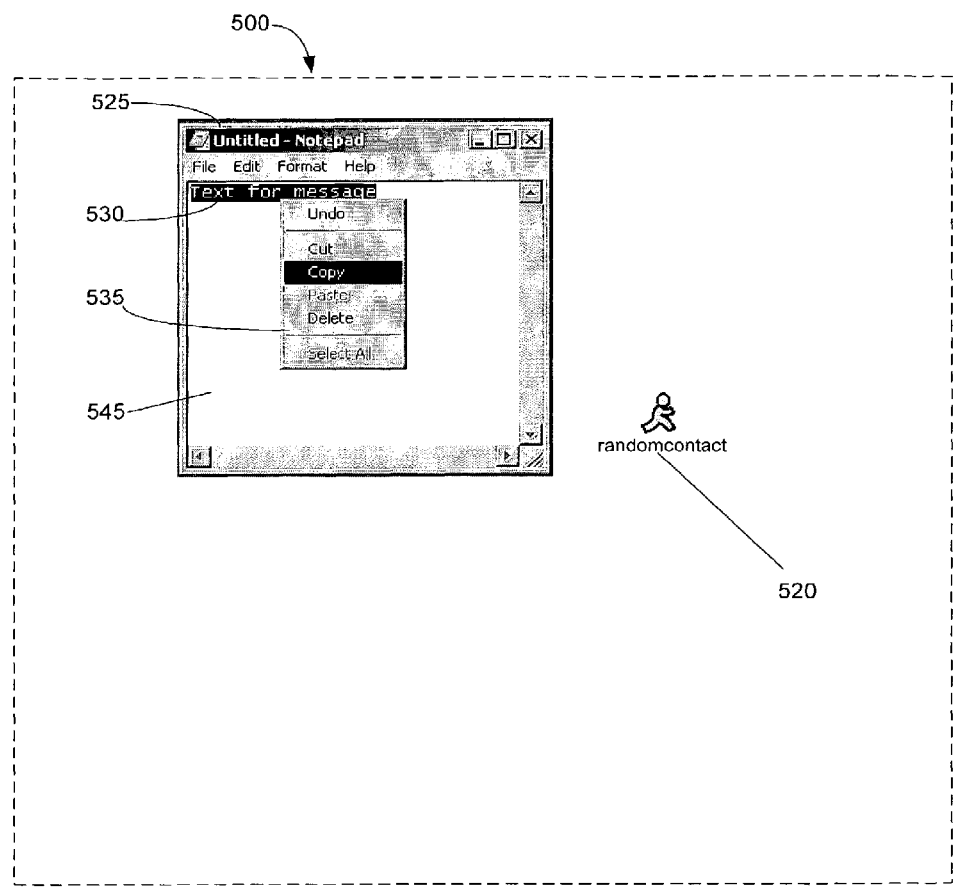
Figure 5I:
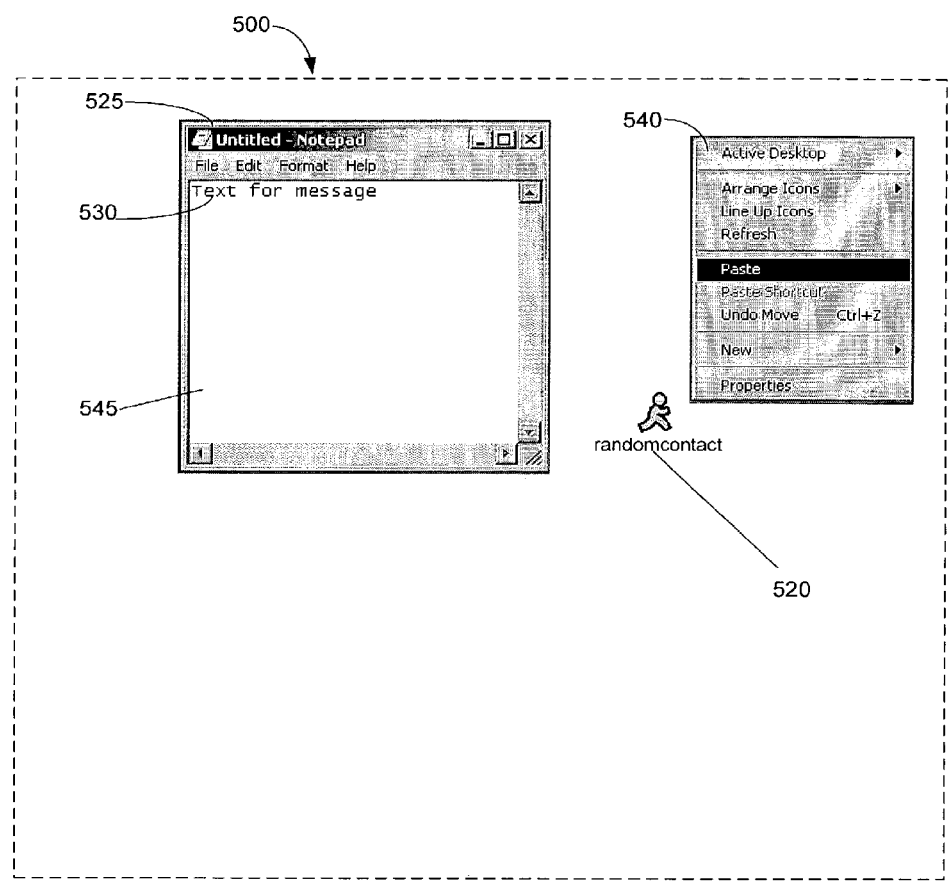

FIGS. 5H and 5I illustrate an alternative (or additional) manner in which instant messaging sessions can be supported by allowing a user to "copy" text from a document and "paste" the text onto icon 520. Referring to FIG. 5H, a desktop 500 is shown with a user interface 525 of a text editor application. The interface 525 of the text editor has a text box 545 in which a user can type text, such as the text 530. The user can also "select" text 530, for example, by pressing a mouse button and dragging a pointer across the text 530. This results in text 530 being highlighted as shown.

After a user selects text 530, the user can "copy" the text, for example, by pressing a mouse button while the pointer is over the text to bring up a context menu 535 and selecting "copy" from the context menu 535. When copied, text 530 is stored by the operating system in a section of memory typically referred to as the "clipboard."

After text 530 has been copied, a user can then "paste" the text 530 to icon 520. Referring to FIG. 5I, the user pastes the text 530 to icon 520, for example, by pressing a mouse button while the pointer is over icon 520 to bring up a context menu 540 and selecting "paste" from the context menu 540. Selecting paste results in the executable program retrieving the text stored in the section of memory referred to as the clipboard. The executable program then passes the screen name represented by icon 520 and the text to the instant messaging program, along with an indication that the text is to be sent as an instant message. The instant messaging program then contacts a host server and transmits the text and screen name to the host server. The host server then directly communicates the text to the contact as an instant message.

Likewise, other operations may be performed on icon 520 to execute corresponding actions related to the contact represented by icon 520. For instance, right-clicking on icon 520 may bring up a context menu that has an option to set an alert when the contact comes online. Selecting the option results in the alert being set for the contact or set of contacts. Double-clicking on the icon may bring up profile information about the contact that icon 520 represents.

In addition, icon 520 may indicate the online presence of the contact it represents. A number of different techniques may be used to indicate online presence. For example, the shape or color of icon 520 may be different when the contact is online as opposed to when the contact is not online. The contact's online status also may be included in profile information that is displayed when a user double-clicks on icon 520. Similarly, icon 520 may show other contextual information regarding the contact, such as how long the contact has been online, whether the contact is away, or whether the contact is using a mobile device.

While the executable program has been described as communicating with the instant messaging program to accomplish the actions, in other implementations the executable program may be able to directly execute the actions itself without the need for an external program such as the instant messaging program.

Some implementations of the described techniques also may support a drag-and-drop method of creating the icon representing a contact. In this case, the icon can be created by dragging and dropping a representation of the contact in the user interface of the communications program onto an area other than the user interface.

Figure 6A:
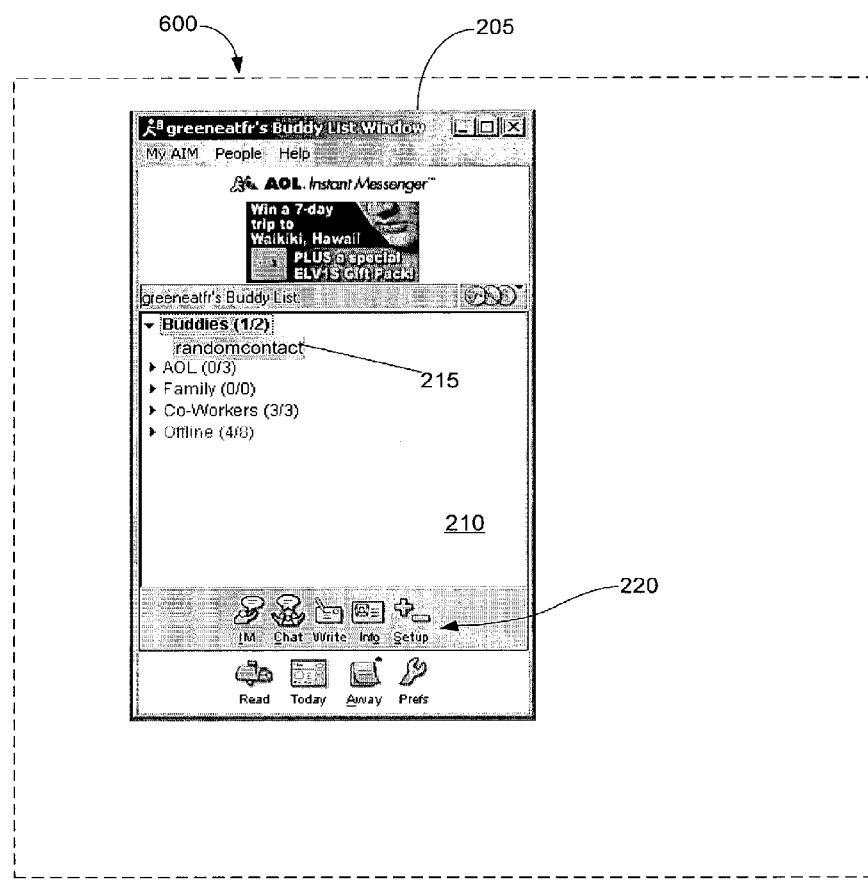
FIGS. 6A-6C are computer desktops illustrating a drag-and-drop manner of creating the stand-alone icon that represents a contact in one implementation for an instant messaging program.
Figure 6B:
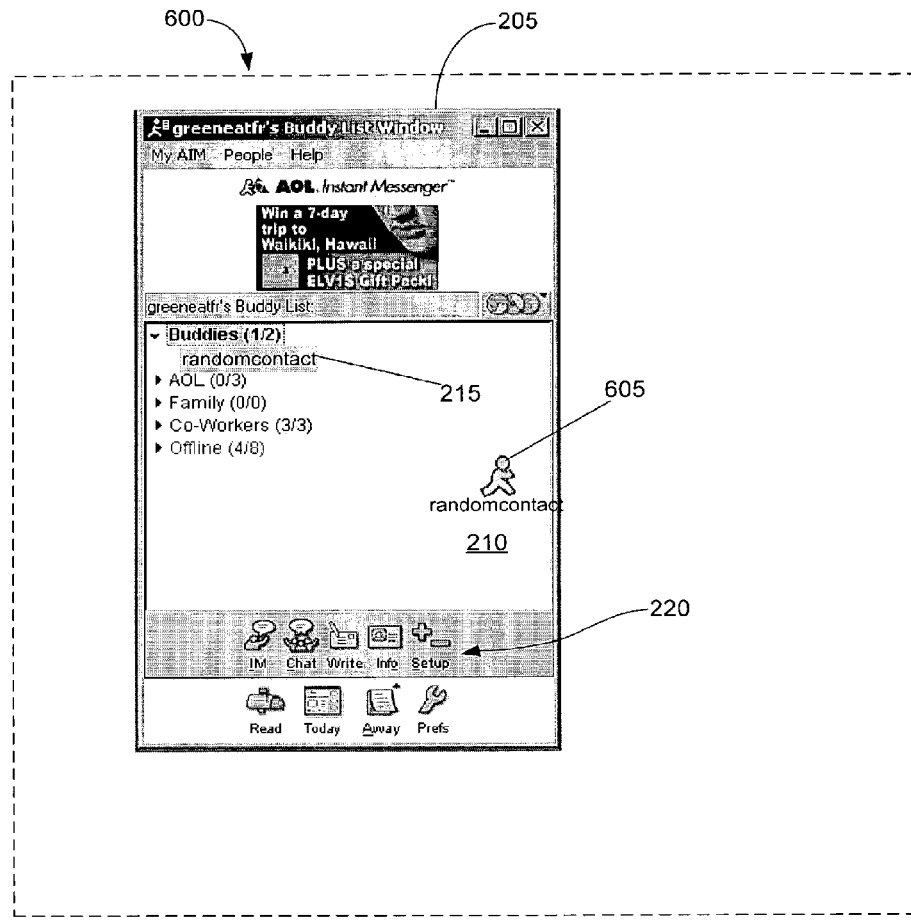
Figure 6C:
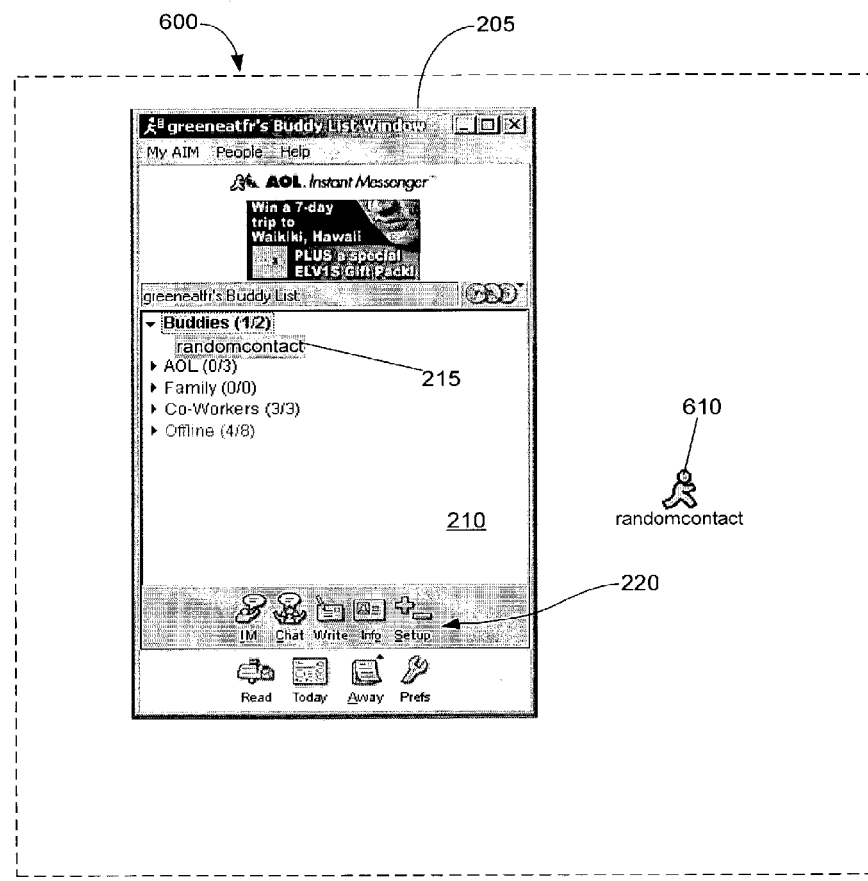

FIGS. 6A-6C illustrate a drag-and-drop manner of creating the icon in one implementation for an instant messaging program. To create the icon that represents the contact "randomcontact," the user selects the representation 215 of "randomcontact" in the instant messaging program's user interface 205 and drags that representation onto an area other than interface 205, such as desktop 600. To drag representation 215 onto desktop 600, the user first selects representation 215, for instance, by pointing at it and pressing a mouse button (shown in FIG. 6A). The user then drags representation 215 towards desktop 600 (shown in FIG. 6B). As the user drags the icon towards desktop 600, a transparent image 605 shows the user where the representation 215 is being dragged. Once image 605 is on top of desktop 600, the user drops image 605 by releasing the mouse button. When the user drops image 605 onto desktop 600, the icon 610 representing the contact is created (shown in FIG. 6C). Icon 610 also is associated with the corresponding executable program, or the executable program is created if it does not exist.

One implementation of creating the icon and executable program in a Macintosh OS X operating system environment uses a "skeleton" executable program and icon that are not specific to any particular contact. When representation 215 is dragged and dropped onto an area other than interface 205, the operating system performs a callback to inform the instant messaging program that representation 215 has been dropped. The instant messaging program then copies the skeleton executable program to the location where representation 215 was dropped. The copied executable program is given the name of the contact. This results in the icon being displayed with the screen name of the contact.

After the executable program is copied, the instant messaging program loads a static text string that contains substitution tokens. The instant messaging program then replaces the substitution tokens with the screen name of the contact. The resulting text is an uncompiled AppleScript. The instant messaging program compiles the AppleScript and inserts it into a resource in the executable program. Thus, once the executable program is created it is unique to that screen name and does not rely on any external data for that association to persist. Similar implementations can be applied to other operating system environments.

Some implementations of the described techniques also may support a drag-and-drop method of adding a contact to the contact list using the icon that represents the contact.

Figure 7A:
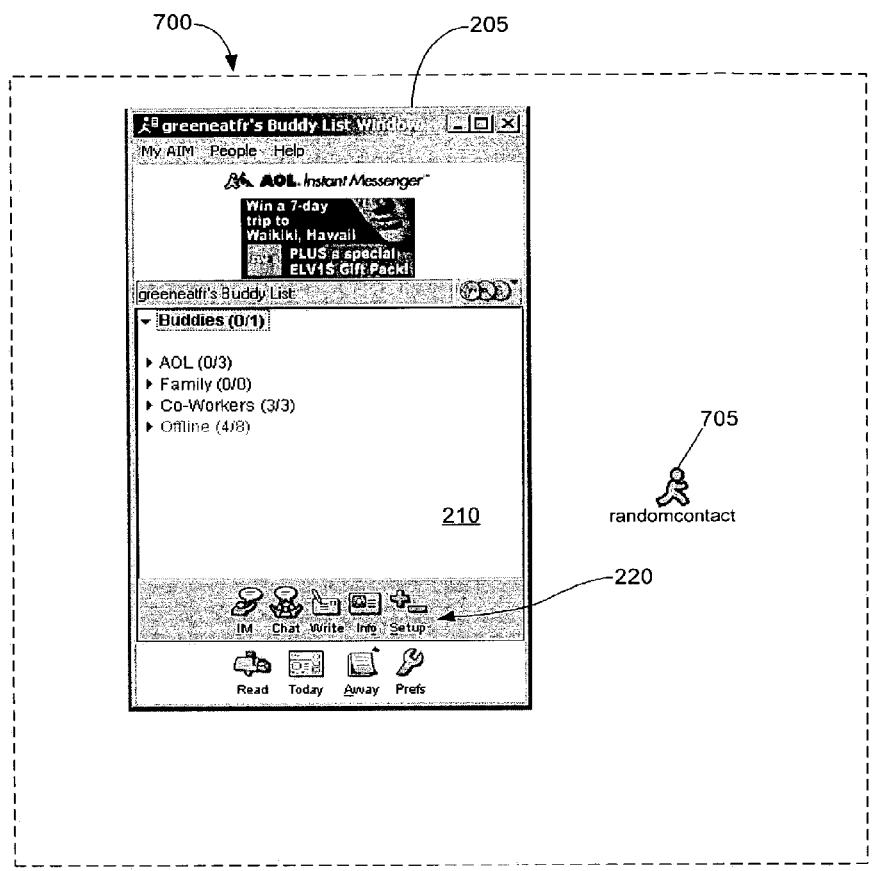
FIGS. 7A-7C are computer desktops illustrating a drag-and-drop manner of adding a contact to the contact list of an instant message program using the stand-alone icon that represents the contact.
Figure 7B:
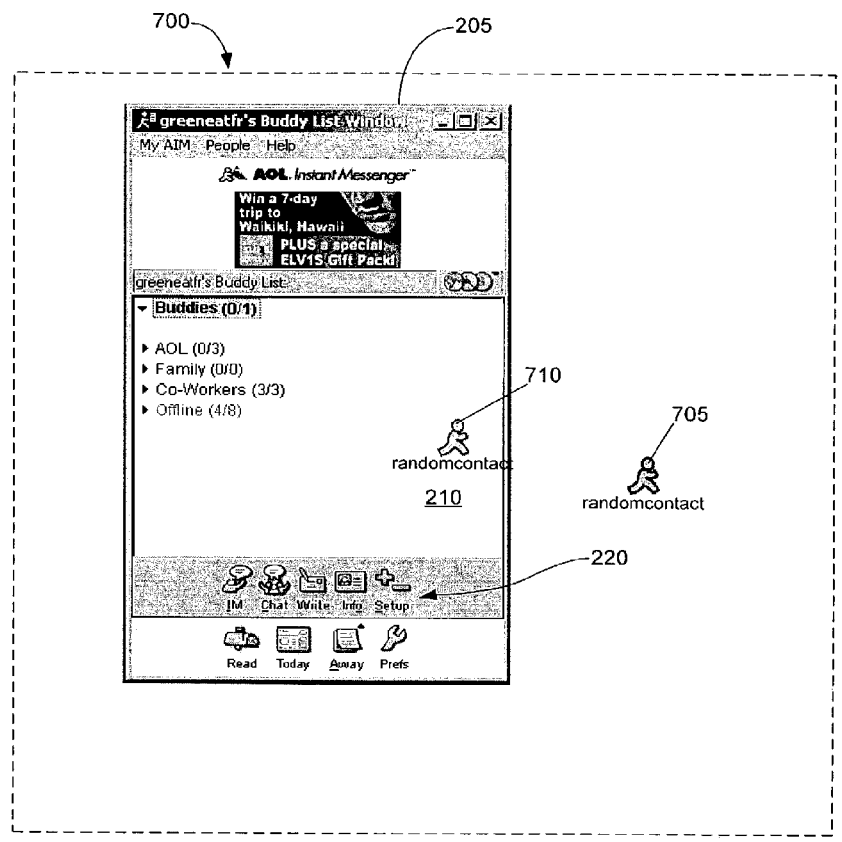
Figure 7C:
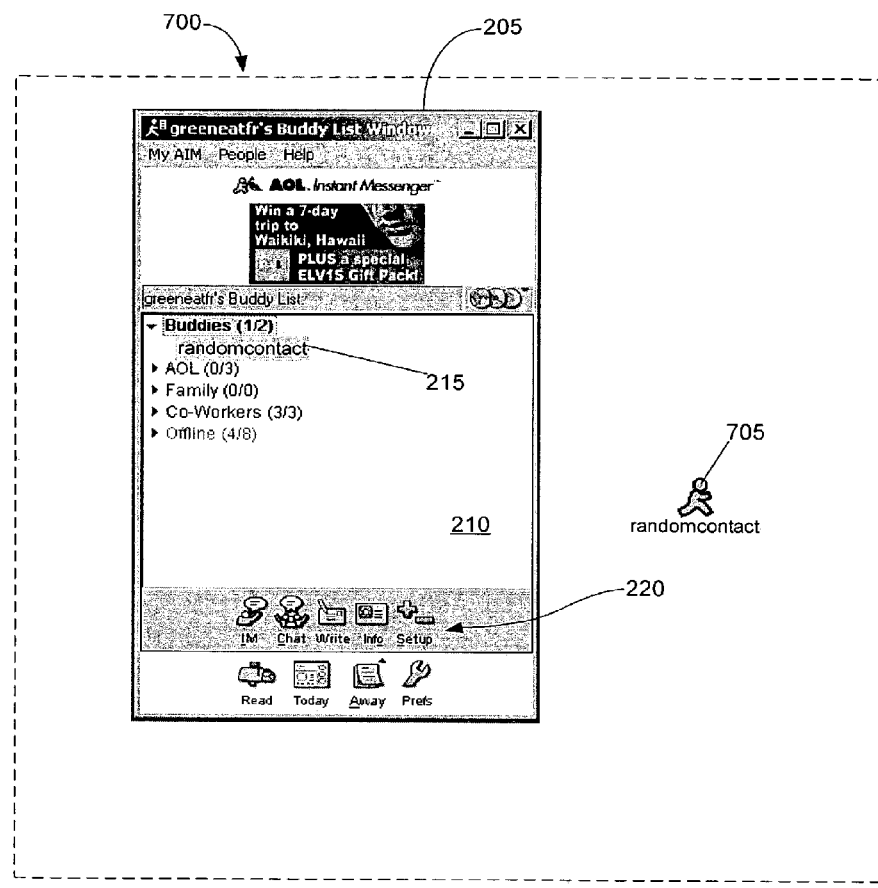

FIGS. 7A-7C illustrate a drag-and-drop manner of adding a contact to the contact list in one implementation for an instant messaging program. An icon 705 representing a contact is located on desktop 700. Icon 705 may have been placed on desktop in any manner. For instance, it may have been created on desktop 700 (e.g., by dragging and dropping from a first instant messaging program as described above) or moved onto desktop 700 after being created in a location other than the desktop. Or, a user of an instant messaging program on a different client system may have created icon 705 and transferred it to the client system providing desktop 700.

To add the contact represented by icon 705 to the contact list in the instant messaging program's user interface 205, the user selects icon 705 and drags it from the desktop (or other location) onto user interface 205. To drag icon 705 onto interface 205, the user first selects icon 705 and drags it towards interface 205 (shown in FIG. 7B). As the user drags the icon towards interface 205, a transparent image 710 shows the user where icon 705 is being dragged. Once image 710 is on top of interface 205, the user drops image 710. When the user drops image 710, the operating system informs the instant messaging program that image 710 has been dropped on interface 205. As a result, the instant messaging program obtains the screen name of the contact, adds the contact to the contact list, and creates the representation 215 of the contact in user interface 205 (shown in FIG. 7C). If the screen name is internally stored in the executable program corresponding to the icon (e.g., similarly to the above described implementation for creating the icon and executable program in a Macintosh OS X operating system environment), the instant messaging program may communicate with the executable to obtain the screen name of the contact. Alternatively, if the filename of the executable program is the screen name of the contact, the instant messaging program may obtain the screen name from the filename of the executable.

Communications programs, including instant messaging programs, may allow a user to group contacts together in groups or sets. The described techniques also can be applied to such groups or sets. Thus, while some implementations have been shown using an icon that represents a single contact, the described techniques also may be used to provide an icon that represents a group or set of contacts in addition, or as an alternative, to providing an icon that represents a single contact.

Figure 8:
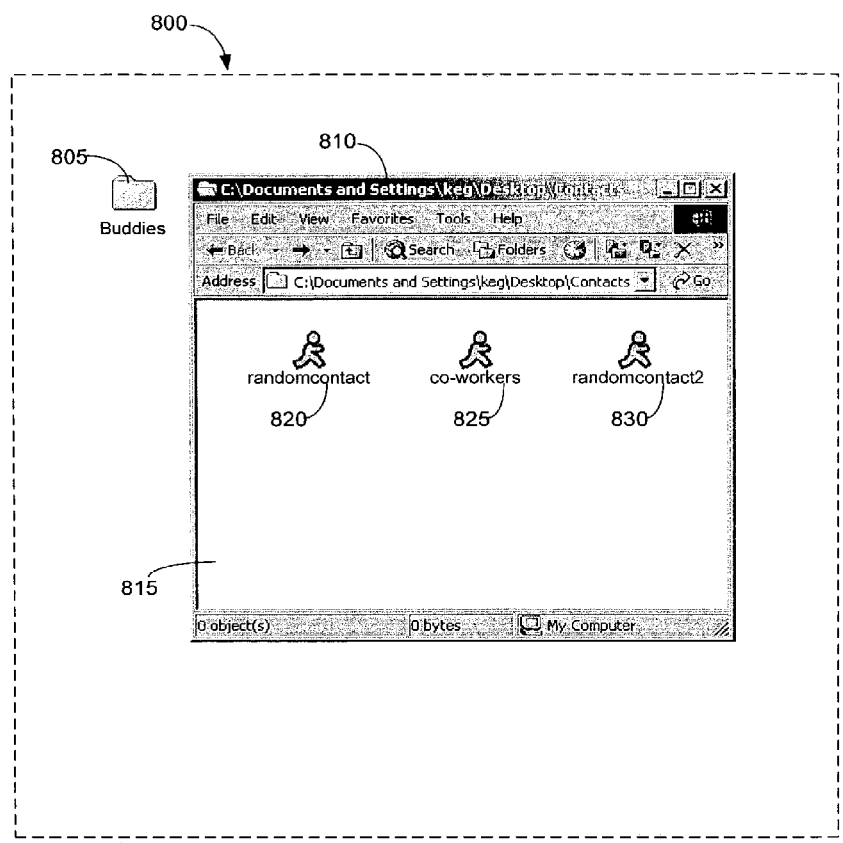
FIG. 8 is a computer desktop illustrating an implementation in which multiple stand-alone icons, each representing either a contact or set of contacts, are situated in a desktop file folder.

FIG. 8 illustrates an implementation in which multiple icons, each representing either a contact or set of contacts, are situated in a desktop file folder. As shown, a file folder 805 is located on a desktop 800. The name of file folder 805 is "buddies." The contents of file folder 805 are displayed by opening it, for example, by double-clicking on file folder 805. When file folder is opened, a window 810 is displayed that shows the contents of file folder 805. Window 810 has a window area 815 in which the multiple icons are displayed. A first icon 820 represents the contact whose screen name is "randomcontact." A second icon 825 represents a set of contacts, collectively grouped as "co-workers," A third icon 830 represents the contact whose screen name is "randomcontact2."

Icons 820, 825, and 830 may indicate the online presence, or other status information, of the respective contact it represents, or status information about contact(s) may be displayed in response to an operation performed on one of the icons 820, 825, or 830, as described above. A user may perform operations on any of the icons 820, 825, or 830 to cause actions to be executed for the contact represented by the respective icon, also as described above. For instance, the program user may drop a binary file onto icon 820 to transfer the file to randomcontact. The program user may drop a text file (or paste text) on icon 825 to initiate a group chat session with the set of contacts grouped as "co-workers" or, depending upon a specified configuration, to invoke independent chat sessions with each contact in the "co-workers" group. The program user also, for instance, may set an alert for when randomcontact2 comes online by selecting icon 830 to bring up a context menu and selecting an alert option from the menu.

The techniques described above are not limited to any particular hardware or software configuration. Rather, they may be implemented using hardware, software, or a combination of both. The methods and processes described may be implemented as computer programs that are executed on device comprising at least one processor and at least one data storage system (e.g., programmable computer, cellular phone, or personal digital assistant). The data storage system may be any type of storage medium or device usable with a processor (e.g., CD-ROM, RAM, or magnetic disk). The programs may be implemented in a high-level programming language and may also be implemented in assembly or other lower level languages, if desired.

Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other communications programs such as FTP programs, e-mail programs, voice-over-IP (VoIP) or other telephony programs, or players for streaming media.

Other implementations are also within the scope of the following claims.

What is claimed is:

1. A method comprising:
providing a stand-alone graphical object that represents a first user of a communications program that facilitates communications across a network, the stand-alone graphical object being configured to allow a user to perform an action otherwise available through an interface of the communications program regardless of whether the interface of the communications program is running when an operation corresponding to the action is performed via the stand-alone graphical object;
detecting, using at least one processor, that a second user has positioned a first icon representing a file to be transferred from the second user to the first user of the communications program on or near the stand-alone graphical object; and
sending the file represented by the first icon to the first user of the communications program regardless of whether the interface of the communications program is running.

2. The method as recited in claim 1, wherein detecting, using the at least one processor, that the second user has positioned the first icon representing the file to be transferred from the second user to the first user of the communications program comprises detecting that the first icon has been dragged and dropped on the stand-alone graphical object.

3. The method as recited in claim 1, wherein detecting, using the at least one processor, that the second user has positioned the first icon representing the file to be transferred from the second user to the first user of the communications program comprises detecting that the first icon has been copied and pasted on the stand-alone graphical object.

4. The method as recited in claim 1, wherein sending the file represented by the first icon to the first user of the communications program comprises sending the file to a server.

5. The method as recited in claim 4, wherein the file comprises a video.

6. The method as recited in claim 1, wherein sending the file represented by the first icon to the first user of the communications program comprises sending a file via a peer-to-peer connection.

7. The method as recited in claim 1, further comprising determining a status of the first user.

8. The method as recited in claim 7, wherein determining the status of the first user comprises determining whether the first user is using a mobile device.

9. The method as recited in claim 7, wherein determining the status of the first user comprises determining what types of connections the first user can accept.

10. The method as recited in claim 7, further comprising:
providing, if the first user has a first status, the stand-alone graphical object in a first configuration to indicate the first status; and
providing, if the first user has a second status, the stand-alone graphical object in a second configuration to indicate the second status.

11. The method as recited in claim 10, wherein providing the stand-alone graphical object in the first configuration to indicate the first status comprises providing the stand-alone graphical object with a first feature.

12. The method as recited in claim 11, wherein providing the stand-alone graphical object in the second configuration to indicate the second status comprises changing the first feature to a second feature.

13. The method as recited in claim 12, wherein:
the first feature comprises a first color; and
the second feature comprises a second color that differs from the first color.

14. The method as recited in claim 13, wherein:
the first status comprises the first user being online; and
the second status comprises the first user being offline.

15. The method as recited in claim 1, wherein providing the stand-alone graphical object that represents the first user comprises providing a second icon that represents a file.

16. The method as recited in claim 15, wherein providing the stand-alone graphical object that represents the first user comprises providing the second icon on a computer desktop.

17. The method as recited in claim 15, wherein providing the stand-alone graphical object that represents the first user comprises providing the second icon in a computer file folder.

18. The method as recited in claim 1, wherein providing the stand-alone graphical object that represents the first user comprises providing a second icon that represents a contact of the second user.

19. The method as recited in claim 1, further comprising displaying the interface upon the second user logging into a host server.

20. A system comprising:
at least one processor; and
a computer readable storage medium storing instructions, that when executed by the at least one processor, cause the system to perform a steps comprising:
providing a first stand-alone icon that represents a first user of a communications program, wherein the first stand-alone icon allows a second user to perform an action otherwise available through an interface of the communications program regardless of whether the interface is running when an operation corresponding to the action is performed via the first stand-alone icon;
detecting, using at least one processor, that a second icon representing a file has been positioned, by the second user, on or near the first stand-alone icon that represents the first user of the communications program; and
sending the first file to the first user in response to detecting that the second icon has been positioned on or near the first stand-alone icon regardless of whether the interface of the communications program is running.

21. The system as recited in claim 20, wherein detecting that the second icon has been positioned on or near the first stand-alone icon comprises determining that the second icon has been dragged and dropped onto the first stand-alone icon.

22. The system as recited in claim 20, further comprising instructions, that when executed by the at least one processor, cause the system to perform a step of determining a status of the first user.

23. The system as recited in claim 22, wherein determining the status of the first user comprises determining whether the first user is using a mobile device.

24. The system as recited in claim 22, wherein determining the status of the first user comprises determining if the first user can accept a peer-to-peer file transfer.

25. The system as recited in claim 22, further comprising instructions, that when executed by the at least one processor, cause the system to perform steps comprising:
providing, if the first user has a first status, the first stand-alone icon in a first configuration to indicate the first status; and providing, if the first user has a second status, the first stand-alone icon in a second configuration to indicate the second status.

26. The system as recited in claim 25, wherein providing the first stand-alone icon in the first configuration to indicate the first status comprises providing the first stand-alone icon with a first feature.

27. The system as recited in claim 26, wherein providing the first stand-alone icon in the second configuration to indicate the second status comprises changing the first feature to a second feature.

28. The system as recited in claim 27, wherein:
the first feature comprises a first color; and
the second feature comprises a second color that differs from the first color.

29. A non-transitory computer-readable storage medium including a set of computer-executable instructions that, when executed by at least one processor of a computer system, cause the computer system to:
provide a first stand-alone icon that represents a first user of a communications program, wherein the first stand-alone icon allows a second user to perform an action otherwise available through an interface of the communications program regardless of whether the interface is running when an operation corresponding to the action is performed via the first stand-alone icon;
detect that a second icon representing a file has been positioned, by the second user, on or near the first stand-alone icon that represents the first user of the communications program; and
send the first file to the first user in response to detecting that the second icon has been positioned on or near the first stand-alone icon regardless of whether the interface of the communications program is running.

30. The non-transitory computer-readable storage medium as recited in claim 29, wherein the computer-executable instructions, when executed, cause the computer system to send the first file to the first user via a peer to peer connection.

31. The non-transitory computer-readable storage medium as recited in claim 30, further comprising computer-executable instructions that, when executed, cause the computer system to determine a status of the first user.

32. The non-transitory computer-readable storage medium as recited in claim 31, wherein the computer-executable instructions that, when executed, cause the computer system to determine a status of the first user comprise computer-executable instructions that, when executed, cause the computer system to determine whether the first user is online or offline.

33. The non-transitory computer-readable storage medium as recited in claim 31, wherein the computer-executable instructions that, when executed, cause the computer system to determine a status of the first user comprise computer-executable instructions that, when executed, cause the computer system to determine if the first user can accept a peer-to-peer file transfer.

* * * * *